US012782071B2

(12) United States Patent
Zusman et al.

(10) Patent No.: US 12,782,071 B2
(45) **Date of Patent: *Nov. 3, 2026**

(54) MAGAZINE WITH EMBEDDED METAL INSERT

(71) Applicant: IMI DEFENSE LTD., Ein Ayala (IL)

(72) Inventors: Nisim Zusman, Ein Ayala (IL); Slava Krupenin, Ein Ayala (IL)

(73) Assignee: IMI Defense LTD, Ein Ayala (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/979,365

(22) Filed: Dec. 12, 2024

(65) Prior Publication Data

US 2025/0109920 A1 Apr. 3, 2025

Related U.S. Application Data

(63) Continuation of application No. 17/915,959, filed as application No. PCT/IL2022/050469 on May 4, 2022, now Pat. No. 12,203,720.

(30) Foreign Application Priority Data

Nov. 4, 2021 (IL) .......................................... 287850

(51) Int. Cl.

| | |
|---|---|
| ***F41A 9/70*** | (2006.01) |
| *B29C 45/14* | (2006.01) |
| *B29K 705/00* | (2006.01) |
| *B29L 31/00* | (2006.01) |

(52) U.S. Cl.

CPC ................ *F41A 9/70* (2013.01); *B29C 45/14* (2013.01); *B29K 2705/00* (2013.01); *B29L 2031/7772* (2013.01)

(58) Field of Classification Search

CPC ...... F41A 9/65; F41A 9/70; F41A 9/71; F41A 9/69; F41A 17/38; F41A 11/02

USPC .......................... 42/50, 49.01, 49.02, 49.1, 6

See application file for complete search history.

(56) References Cited

U.S. PATENT DOCUMENTS

| | | | |
|---|---|---|---|
| 3,383,790 | A | 5/1968 | Into |
| 3,732,643 | A | 5/1973 | Wells |
| 4,391,055 | A | 7/1983 | Kadim |
| 5,566,487 | A | 10/1996 | Vaid et al. |
| 8,028,455 | B1 | 10/2011 | Battaglia |
| 10,066,886 | B2 | 9/2018 | Vilardi et al. |
| 10,161,698 | B2 | 12/2018 | Nakayama et al. |
| 10,809,027 | B2 | 10/2020 | Michut |

(Continued)

FOREIGN PATENT DOCUMENTS

KR 102255425 B1 5/2021

OTHER PUBLICATIONS

Jul. 17, 2022—(WO) International Search Report and Written Opinion—App PCT/IL2022/050469.

(Continued)

*Primary Examiner* — Michael D David

(74) *Attorney, Agent, or Firm* — Banner & Witcoff, Ltd.

(57) ABSTRACT

A magazine may include a body comprising a magazine catch, and an insert in which the insert may be positioned on an upper portion of an interior of the body, the insert may include a magazine catch extension, the magazine catch extension may bend outward away from the body to reinforce the magazine catch, and the insert may be formed of a metal, an alloy, or combinations thereof.

20 Claims, 11 Drawing Sheets

(56) References Cited

U.S. PATENT DOCUMENTS

| | | | |
|---|---|---|---|
| 10,809,028 | B2 | 10/2020 | Underwood et al. |
| 11,054,201 | B2 | 7/2021 | Fazer |
| 11,054,202 | B1 | 7/2021 | Underwood et al. |
| 11,067,351 | B2 | 7/2021 | Underwood et al. |
| 11,280,569 | B2 | 3/2022 | Yeates et al. |
| 11,592,250 | B2 | 2/2023 | No |
| 11,852,429 | B1 | 12/2023 | Dwyer et al. |
| 2003/0089014 | A1 | 5/2003 | Schuerman |
| 2010/0281737 | A1 | 11/2010 | Cahill |
| 2011/0094137 | A1 | 4/2011 | Fluhr |
| 2012/0233899 | A1 | 9/2012 | Daniel et al. |
| 2012/0255209 | A1 | 10/2012 | Klassen |
| 2013/0086834 | A1 | 4/2013 | Battaglia |
| 2013/0247437 | A1 | 9/2013 | Obermeit |
| 2014/0352189 | A1 | 12/2014 | Fitzpatrick et al. |
| 2015/0192384 | A1 | 7/2015 | Ballard |
| 2016/0116239 | A1 | 4/2016 | Nakayama et al. |
| 2024/0219134 | A1 * | 7/2024 | Zusman .................... F41A 9/65 |

OTHER PUBLICATIONS

Jeremy S., What happens when you peel open a Glock magazine, The Truth About Guns, Retrieved on Jul. 17, 2022 from <https://www.thetruthaboutguns.com/what-happens-when-you-peel-open-a-glock-magazine/>, Sep. 7, 2017.
May 13, 2024—(IL) Office Action—App 287850.
Jun. 11, 2024—(EP) Rule 161(2) & 162 EPC Communication—App 22889565.2.
Apr. 1, 2025—(IL) Office Action—App 287850.
Aug. 8, 2025—EP Search Report—App 22889565.2.

* cited by examiner

MAGAZINE WITH EMBEDDED METAL INSERT

CROSS REFERENCE TO RELATED APPLICATIONS

This application is a continuation of U.S. application Ser. No. 17/915,959, which was filed on Sep. 29, 2022, which is a U.S. National Phase of International Application No. PCT/IL2022/050469, which was filed on May 4, 2022, designating the United States of America and claiming priority to Israeli Application No. 287850, filed on Nov. 4, 2021. All of the above applications are incorporated herein by reference.

TECHNICAL FIELD

This disclosure relates to the field of firearm ammunition magazines with embedded metal inserts and methods of making firearm ammunition magazines with embedded metal inserts. The disclosure particularly relates to reinforced rifle or pistol ammunition magazines containing internal overmolded metal inserts and methods of making such ammunition magazines.

BACKGROUND

Conventional metal and polymer rifle and pistol ammunition magazines are designed to hold and feed ammunition of a particular caliber into the firing chamber of a firearm. Repeated cycling, firing, and ejection of ammunition in a firearm may damage or weaken the components of an ammunition magazine. Further, repeated loading and unloading of magazines, as well as repeated insertion of magazines into weapon magazine wells, and extraction of magazines further stresses, strains, and weakens magazine components. Accordingly, there is a need for an ammunition magazine that address the wear and tear of normal usage and overcomes the limitations of prior art devices.

SUMMARY

This Summary introduces a selection of concepts relating to this technology in a simplified form as a prelude to the Detailed Description that follows. This Summary is not intended to identify key or essential features.

In some aspects, an ammunition magazine is disclosed that may include a body, a follower engaged with a spring and a floorplate retainer, a floor plate engaged with the floorplate retainer and the body, and a metal insert positioned on an upper portion of an interior of the body. In some examples, the magazine body may be a polymer, a metal, an alloy, or combinations thereof. In other examples, the metal insert may include a first and a second upper lip, and wherein the first and second upper lips are positioned on an interior portion of a magazine body set of lips. In certain examples, the first and second upper lips may include a curvature, and the curvature of the first and second upper lips may match a curvature of the magazine body set of lips.

In other examples, the metal insert may include a first side and a second side engaged with a rear surface enhancement or rear side, and the first and second upper lips may be positioned at an upper portion of the first and second sides, and the rear side may be positioned adjacent to a rear portion of the body. In some examples, a height of the first and second sides may be greater than a height of the rear side. In still other examples, the rear side may include at least one orifice, and the first and second sides may include a plurality of orifices, and the plurality of orifices may include an area or diameter that is smaller than an area or diameter of the orifice on the rear side. In still other examples, the metal insert may include a height, and the height of the metal insert may exceed a height of the follower.

In some examples, the magazine body may also include a magazine catch, and the metal insert may also include a magazine catch extension. In another example, the metal insert magazine catch extension may be positioned adjacent to and/or positioned on top of the magazine catch. In other examples, the magazine catch may be positioned on a first side of the metal insert, the first side of the metal insert may include a height, and the first side of the metal insert height may be greater than a height of a second side of the metal insert. In still other examples, the metal insert may be overmolded with the magazine body.

In other aspects, an ammunition magazine is disclosed that may include a polymer body and a metal or alloy reinforcement insert positioned on an upper portion of an interior of the magazine body, and the insert may be overmolded by the upper portion of the magazine body. In some examples, the insert may also include a pair of sides engaged with a rear side that is positioned adjacent to a rear portion of the body. In other examples, the body may also include a magazine catch, the insert may also include a magazine catch extension, and the magazine catch extension may be positioned adjacent to and/or positioned on top of the magazine catch.

In still other aspects, a method of making an ammunition magazine is disclosed that may include the steps of implanting a metal or alloy insert in a magazine body mold, injecting a polymer in the magazine body mold, overmolding at least a portion of the insert with the polymer, and forming the magazine body in which the insert may be positioned on an upper portion of an interior of the magazine body. In other examples, the insert may include a magazine catch extension, a pair of sides engaged with a rear side, and the rear side may be positioned adjacent to a rear portion of the magazine body. In another example, the body may include a magazine catch configured to engage the insert magazine catch extension.

These and other features, advantages, and objects of the present disclosure will be further understood and appreciated by those skilled in the art by reference to the following specification, claims, and appended drawings, where various embodiments of the design illustrate how concepts of this disclosure may be used.

BRIEF DESCRIPTION OF THE DRAWINGS

A more complete understanding of features described herein and advantages thereof may be acquired by referring to the following description in consideration of the accompanying drawings, in which like reference numbers indicate like features.

DETAILED DESCRIPTION

In the following description of the various embodiments, reference is made to the accompanying drawings identified above and which form a part hereof, and in which is shown by way of illustration various embodiments in which features described herein may be practiced. It is to be understood that other embodiments may be utilized and structural and functional modifications may be made without departing from the scope described herein. Various features are capable of other embodiments and of being practiced or being carried out in various different ways.

Ammunition magazines may take many forms and may be constructed of metals, alloys, polymers, and combinations thereof. Conventional magazines are used by various types of firearms that include pistols and rifles. The magazines are typically configured to hold a single type of ammunition and may be reloaded repeatedly manually or in some cases using specially designed ammunition loaders. Magazine components typically include a magazine body, a floor plate, a follower, a spring, and a spring plate. In most cases, the follower is attached to the top of the spring, and the bottom of the spring is attached to the spring plate. The spring plate is positioned on a top of the base plate inside the magazine body. The follower is retained within the magazine by a pair of lips formed at the top of the magazine body. During loading of a magazine, the ammunition is forced on a top of the follower and into the magazine body. Each subsequent round of ammunition loaded into the magazine compresses the spring within the magazine body. The ammunition is retained in the magazine by the curved pair of lips at the top of the magazine body.

The compressed spring will force the follower upwards within the magazine as ammunition is fed into the firing chamber of a firearm. The repeated feeding, cycling, firing, extraction, and ejection of ammunition in a firearm, as well as the insertion and extraction of magazines into a firearm, may cause magazine component failures over time. In particular, the lips at the upper portion of the magazine may fracture or fail rendering the magazine inoperable. As disclosed herein, the upper portion of the magazine may be reinforced by a novel reinforcement insert from within the magazine body itself.

Figure 1:
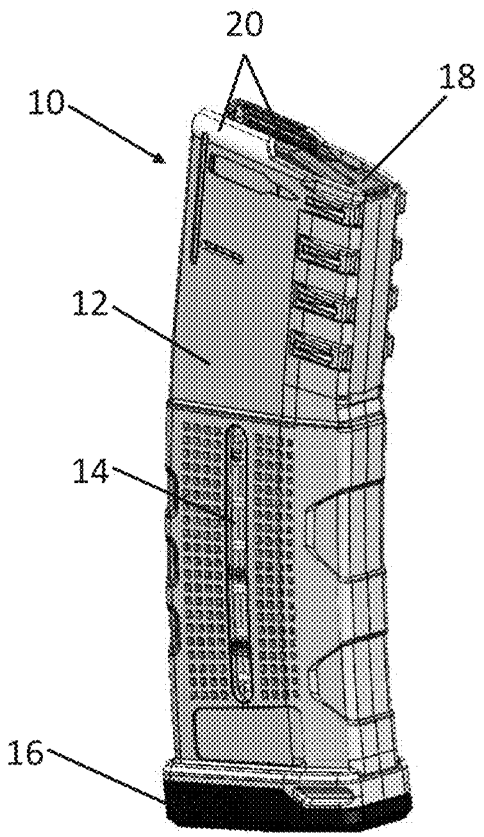
FIG. 1 is a front-right perspective view of an ammunition magazine disclosed herein.

FIG. 1 is a front-right perspective view of an example ammunition magazine 10 comprising such an insert. The example magazine 10 may include a magazine body 12, at least one, or multiple, ammunition level indicator windows 14, a floor plate 16, and a follower 18. The magazine body may be formed of a metal, a metal alloy, a polymer, or combinations thereof. At the top of the magazine 10, two curved lips 20 may be formed in the magazine body. The magazine lips 20 retain ammunition rounds within the magazine along with the follower 18. As a firearm bolt pushes a round forward and past the lips 20, the round is released and forced upwards and forward into the firing chamber and barrel of the weapon. Another round is pushed upwards by the follower 18 and spring and retained within the magazine 10 by the lips 20. The curvature of the lips 20 may follow the curvature of the ammunition, which may typically be cylindrical. The ammunition level indicator windows 14 may provide a shooter the ability to visually check the ammunition level or number of rounds in the magazine. In some examples, the magazine body 12 or window 14 may include numerals or tick marks embossed or engraved on the magazine body 12 proximate the windows 14 or on the windows 14 to provide the number of rounds loaded and remaining in the magazine 10. In some examples, the ammunition level indicator window 14 or magazine body may include, for example, at least, greater than, less than, equal to, or any number in between about 1 through 100 numerals indicating rounds remaining.

Figure 2:
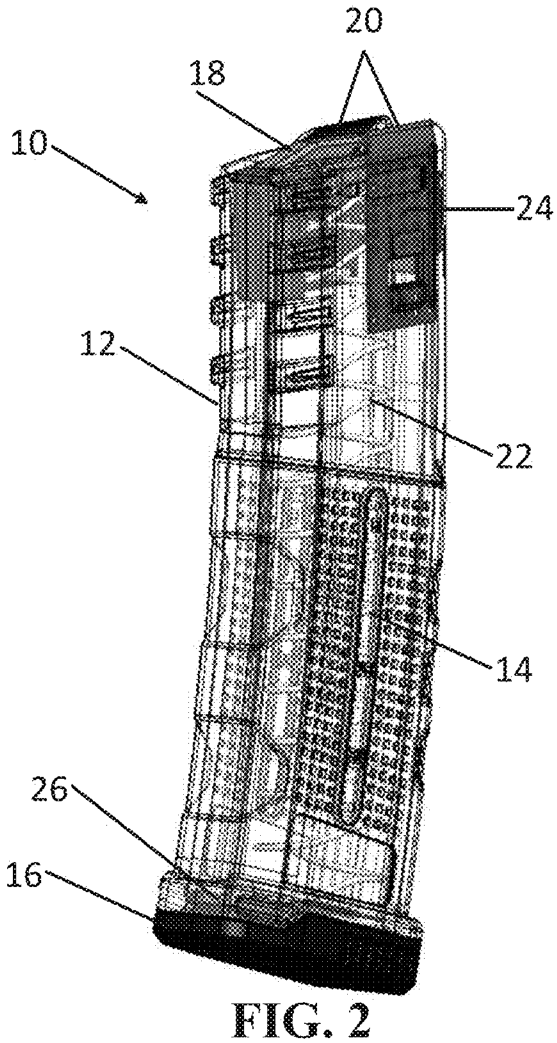
FIG. 2 is a front-left perspective sectional view of the ammunition magazine of FIG. 1.

FIG. 2 is a front-left perspective sectional view of an example ammunition magazine 10 comprising a reinforcement insert 24. Spring 22 may be engaged with follower 18 and the floor plate retainer 26. Floor plate retainer 26 may be configured to engage the floor plate 16. Floor plate 16 may be removably attached to the bottom of the magazine body 12. Floor plate 16 may be attached to the bottom of the magazine body 12 by a tongue and groove configuration, allowing the floor plate 16 to slide on to ridges formed on the magazine body 12 walls. The floor plate 16 may include grooves or slots to allow the floor plate 16 to be secured to the magazine body 12. The configuration may also be reversed and the body 12 may include slots that allow a friction fit with ridges formed on the floor plate 16. The floor plate 16 may also be secured to the magazine body 12 by screw or other fastener. The floor plate 16 may be removed to allow the floor plate retainer 26, spring 22, and follower 18 to be removed from the bottom of the magazine body 12 for cleaning, repair, and or replacement. Reinforcement insert 24 may be formed of a metal, metal alloy, polymer, or combinations thereof. The insert 24 may be positioned inside of the magazine and adjacent to the side walls and the rear wall of the magazine 10.

Figure 3:
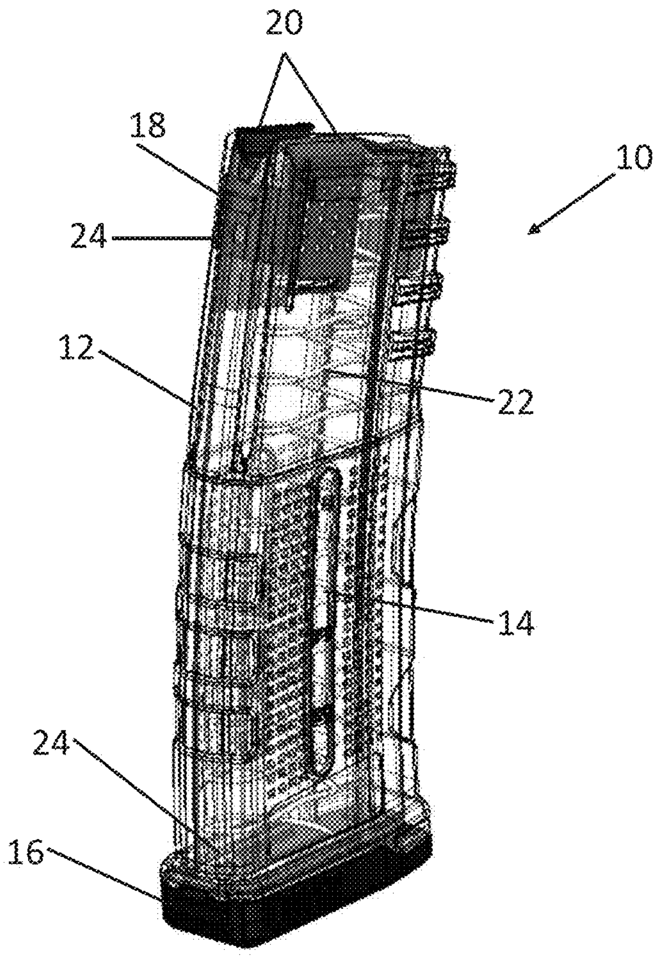
FIG. 3 is a rear-right perspective sectional view of the ammunition magazine of FIG. 1.

FIG. 3 is a rear-right perspective sectional view of an example ammunition magazine 10 comprising a reinforcement insert 24. As previously disclosed, spring 22 may be engaged with follower 18 and the floor plate retainer 24. In some examples, the magazine body 12 may include an ammunition level indicator window 14 to provide the number of rounds loaded and remaining in the magazine 10 on one or both sides of the magazine 10. The insert 24 may be positioned inside of the magazine and adjacent to the side walls and the rear wall of the magazine 10. The top of the insert 24 may follow the interior contours of magazine lips 20.

Figure 4:
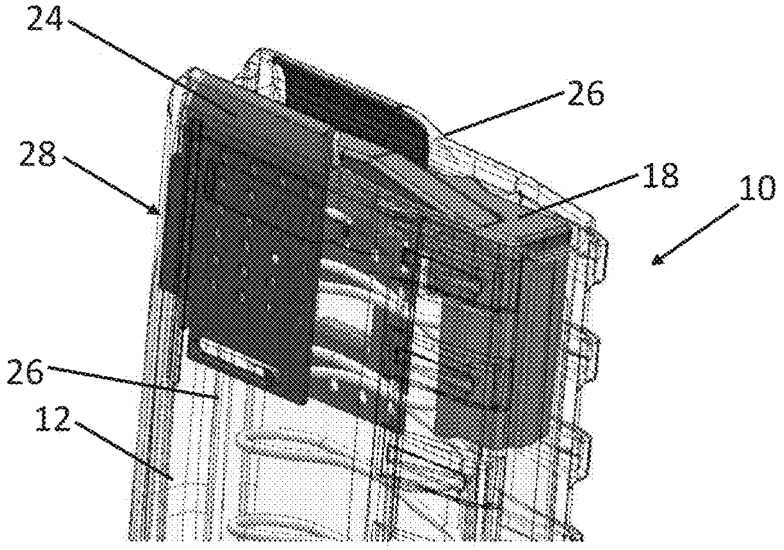
FIG. 4 is a front-right perspective sectional view of the ammunition magazine of FIG. 1.

FIG. 4 is a front-right perspective sectional view of the upper portion of an example ammunition magazine 10 with the reinforcement insert 24 positioned on the interior upper portion of the magazine body 12. The reinforcement insert 24 is positioned on each of the two side walls 26 of the magazine body 12 and on the rear wall 28 of the magazine body 12. The insert walls may straddle a portion of the follower 18.

Figure 5:
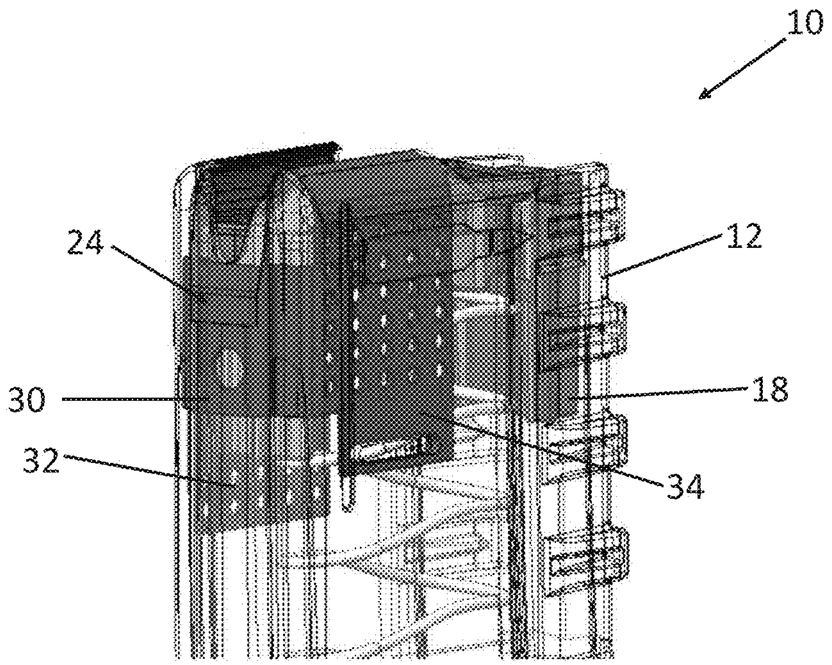
FIG. 5 is a rear-right perspective sectional view of the ammunition magazine of FIG. 1.

FIG. 5 is a rear-right perspective sectional view of an example ammunition magazine 10 with the reinforcement insert 24 positioned on the interior upper portion of the magazine body 12. The reinforcement insert 24 may include a rear surface enhancement or rear side 30 positioned between and connected to an insert left side 32 and an insert right side 34. Rear surface enhancement 30 may be generally square or rectangular shaped. Rear surface enhancement 30 may include a height that may be less than a height of left side 32 and less than right side 34. In some examples, insert right side 34 may include a lower or bottom portion that extends below the bottom of the follower 18. In other examples, the insert right side 34 may include a bottom portion that may extend to a point that is roughly equal to the bottom of the follower 18. In still other examples, insert right side 34 may include a bottom portion that extends to a point that is above or higher than the bottom of the follower 18. The height of the right side 34 or the extent at which the insert right side 34 extends in relation to the overall height of the follower 18 or in relation to the bottom of the follower 18 may help determine the strength and effectiveness of the reinforcement capabilities of the insert 24 as well as provide a weight reduction of insert 24.

Figure 6:
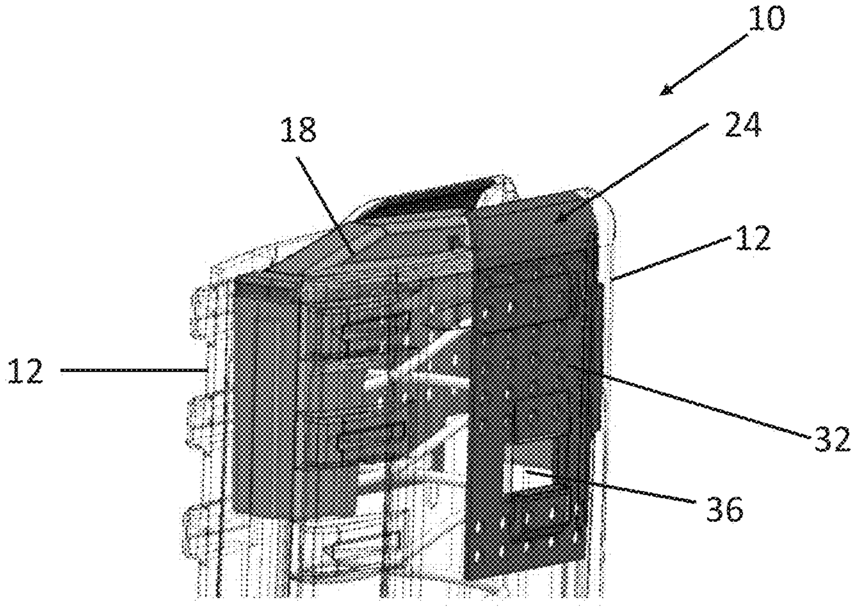
FIG. 6 is a front-left perspective sectional view of the ammunition magazine of FIG. 1.

FIG. 6 is a front-left perspective sectional view of an example ammunition magazine 10 with the reinforcement insert 24 positioned on the interior upper portion of the magazine body 12 and saddled between and behind the follower 18. The reinforcement insert 24 may include an insert left side 32. In some examples, insert left side 32 may include a lower or bottom portion that extends below the bottom of the follower 18. In other examples, the insert left side 32 may include a bottom portion that may extend to a point that is roughly equal to the bottom of the follower 18. In still other examples, insert left side 32 may include a bottom portion that extends to a point that is above or higher than the bottom of the follower 18. The height of the left side 32 or the extent at which the insert left side 32 extends in relation to the overall height of the follower 18 or in relation to the bottom of the follower 18 may help determine the strength and effectiveness of the reinforcement capabilities of the insert 24. In other examples, the insert 24 may include an opening 36 on the left side 32. In some examples, opening 36 may have a square or rectangular shape, and in other examples, the opening 36 may be colinear with the magazine 10 catch. The magazine catch allows the magazine to be locked in place when the magazine 10 is inserted into the firearm magazine well. The firearm may usually include a magazine release that unlocks the magazine so that it may then be removed and replaced by another magazine. The configuration and dimensions of the insert left side 32 may provide additional strength and reinforcement to the magazine catch.

Figure 7:
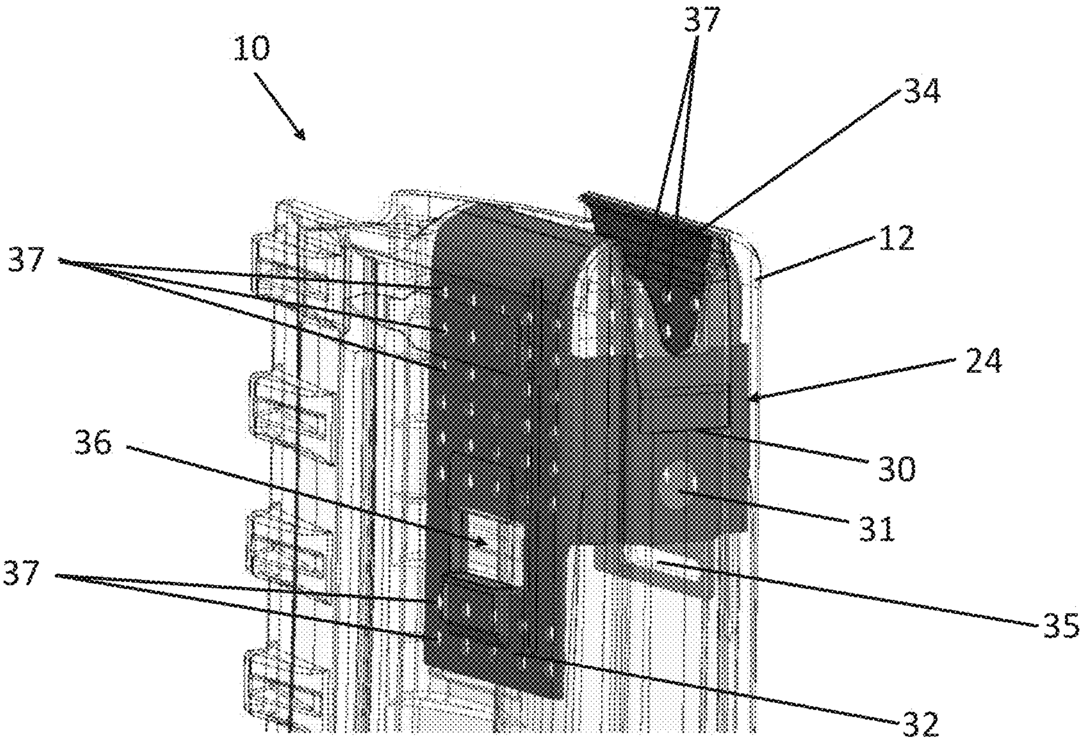
FIG. 7 is a rear-left partially-exploded sectional view of the ammunition magazine of FIG. 6.

FIG. 7 is a rear-left partially-exploded sectional view of an example ammunition magazine 10 with a reinforcing insert 24. The magazine insert left side 32 may include magazine catch opening 36 and may include several orifices 37. Insert right side 34 may also include a plurality of orifices 37. Orifices 37 may improve the strength and reduce the overall weight of the insert 24. In addition, orifices 24 may provide additional surface area to secure the insert 24 in place within the magazine body 12 during the overmolding process to form the magazine 10. In some examples, the insert left side 32 may include a first set of orifices 37 positioned above the magazine catch opening 36. In other examples, the insert left side 32 may include a second set of orifices 37 positioned below the magazine catch opening 36. Orifices 37 may be generally circular, spherical, or oval shaped. In other examples, orifices 37 may be square, rectangular, or polygonal shaped. In other examples, the orifices 37 may be positioned in parallel rows or columns. In other examples, the orifices 37 may be positioned in a nonlinear or random manner. In some examples, the insert left side 32 may include at least 40 individual orifices 37. In other examples, the insert right side 34 may include at least 24 individual orifices 37. In still other examples, the insert left side 32 and/or right side 34 may include, for example, at least, greater than, less than, equal to, or any number in between about 1 through 100 orifices. In another example, insert right side 34 may include a cutout 35 positioned near the lower portion of the insert side 34. Cutout 35 may be generally oval, rectangular, or polygonal shaped. Cutout 35 improves the strength and reduces the overall weight of the insert 24. In addition, cutout 35 provides additional surface area to secure the insert 24 in place within the magazine body 12 during the overmolding process to form the magazine 10.

Figure 8:
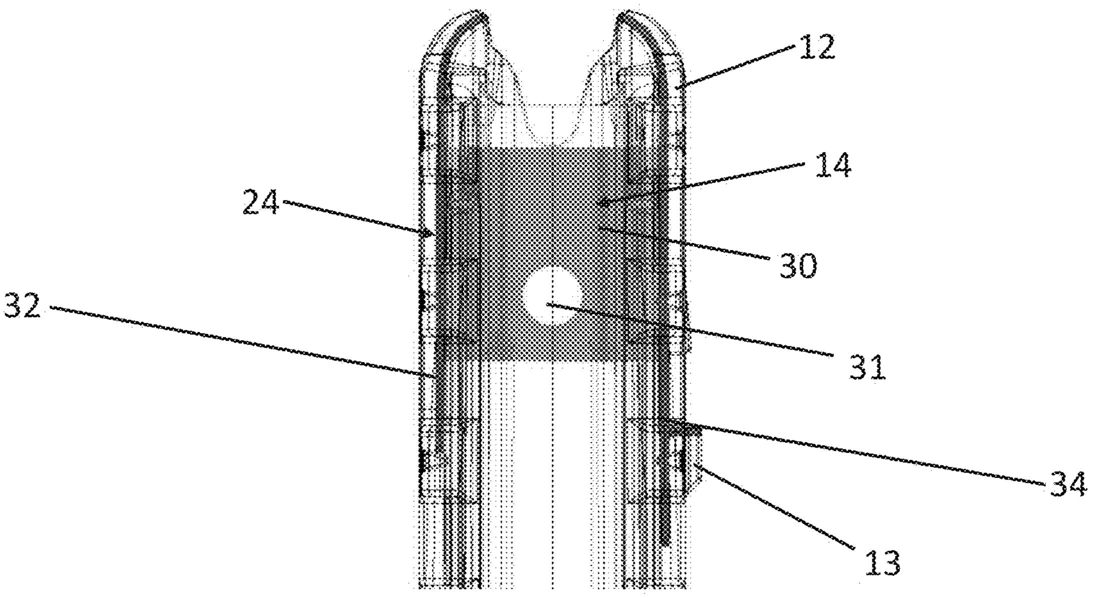
FIG. 8 is a front partially-exploded sectional view of the ammunition magazine of FIG. 7.

As shown in FIG. 8, rear surface enhancement or rear side 30 may connect insert left side 32 with insert right side 34, may include at least one orifice 31. Rear surface enhancement 30 may provide additional strength to absorb the forces from the cycling of the bolt carrier group or a weapon each time the weapon is fired. The reinforcement of the rear side of the magazine body may prevent fracturing or other failure common in conventional magazines due to the forces of the bolt carrier group and elevated temperatures experienced during firing (i.e., heat). In other examples, rear surface enhancement 30 may include a plurality of orifices 31. Orifice 31 may be generally circular, spherical, oval, rectangular, square, or polygonal shaped. In other examples, orifice 31 may be square, rectangular, or polygonal shaped. The orifice 31 may improve the strength and reduce the overall weight of the insert 24, and may provide additional surface area to secure the insert 24 in place within the magazine body 12 during the overmolding process to form the magazine 10. In some examples, orifice 31 may be positioned near a bottom one-third of the back portion 30. In another example, orifice 31 may be positioned in the middle portion of back portion 30. In still another example, orifice 31 may be positioned near an upper one-third of the back portion 30. In yet other examples, orifice 31 may be positioned near the upper one-half or near the bottom one-half of the back portion 30. As also shown in FIG. 8, insert right side 34 may include an overall height that is greater than the height of insert left side 32. The bottom of the insert right side 34 may extend below the bolt catch 13 of magazine 12. As also shown in FIG. 8, the insert 24 may be overmolded by the material forming the magazine body 12. In some examples, insert 24 may be entirely covered by the magazine body 12 polymer. In other examples, insert 24 may be entirely covered by the polymer forming the magazine body 12. In other examples, insert 24 may be partially covered by the magazine body 12 polymer.

Figure 9B:
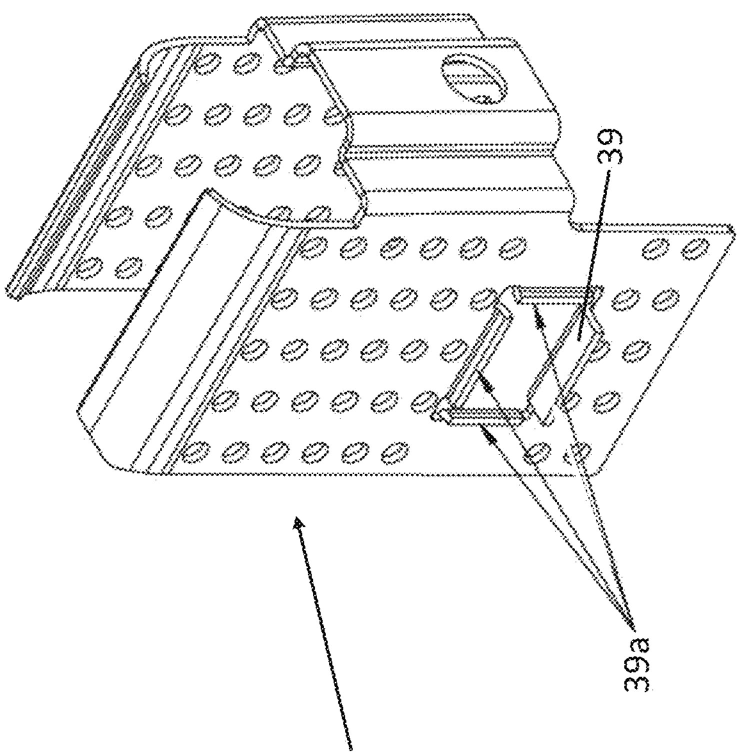
FIGS. 9A and 9B are perspective partially-exploded sectional views of an ammunition magazine and reinforcement insert disclosed herein.
Figure 9A:
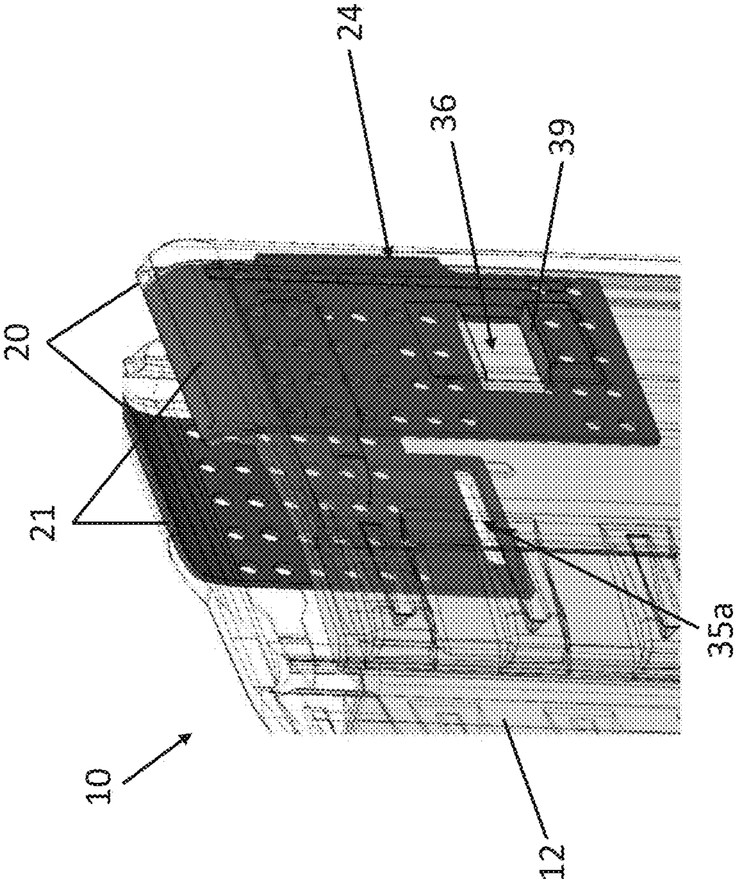

FIG. 9A is a front-left perspective partially-exploded sectional view of an example ammunition magazine 10 including a reinforcement insert 24. Insert 24 may include a magazine catch extension 39 positioned on the insert left side 32. The magazine catch extension 39 may protect the magazine catch from excessive wear and tear, and breakage preserving the life of the magazine. In some examples, magazine catch extension 39 may be entirely covered by the magazine body 12 polymer. In other examples, magazine catch extension 39 may be partially covered by the magazine body 12 polymer. In still other examples, only a top surface of magazine catch extension 39 may not include a polymer covering, leaving the top surface of magazine extension 39 exposed. Such a configuration may improve the release and locking of the magazine in the firearm. As shown in FIG. 9B, insert 24 may include at least one, at least two, or at least three sections 39*a*, in addition to magazine extension 39, that bend outward to reinforce the magazine catch.

During the overmolding process, an operator may manually position the insert 24 on the mold slider—the portion that creates the internal area of the magazine—while the tool (i.e., mold) is open, and the slider moves into position without any required pressure or force exerted on the metal insert. The reinforcement insert 24 may be locked into position using the magazine catch opening 36. As described above, the reinforcement insert 24 may include a plurality of sections 39*a* that bend outward to reinforce the magazine catch. The bent sections 39*a* may lock the reinforcement insert 24 into position by engaging the magazine catch opening 36 on the magazine body 12. In an alternative example, as shown in FIG. 9A, the reinforcement insert 24 may further include an open slot 35*a* positioned on the inner cavity side and the magazine body 12, to assist in aligning the insert during the molding process and to accommodate different firearms, such as an AR-180. After the reinforcement insert 24 is locked in place, the tool may apply pressure and the polymer may flow from the gate point positioned at the bottom of the magazine. The polymer may cover the reinforcement insert 24 in part or completely. The reinforcement insert 24 may be seen from the inside of the magazine as it may be flush with the magazine body 12 internal surfaces. Upon completion of polymer injection, the mold opens and the magazine is ejected from the tool and the process is repeated.

Figure 10:
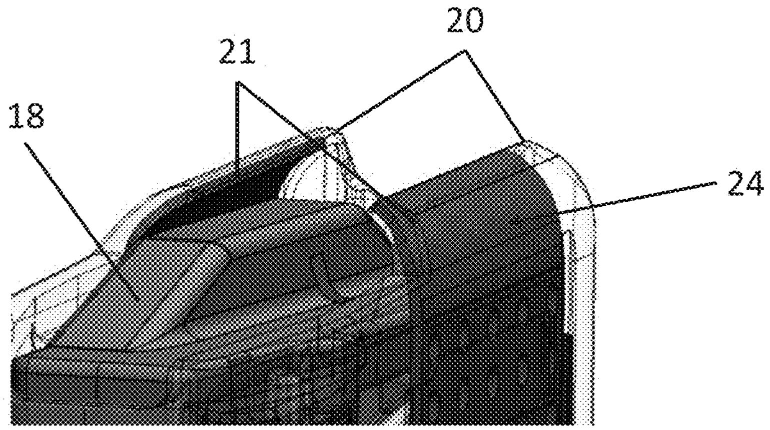
FIG. 10 is a front-left perspective partially-exploded sectional view of the ammunition magazine of FIG. 9.

As shown in FIG. 10, curved upper portions 21 of the insert 24 may have the same basic curvature of magazine lips 20. In some examples, insert 24 may be partially covered by the magazine body 12 polymer such that a portion of the insert curved upper portions 21 may be exposed and not completely covered by polymer. Such a configuration may improve the feeding of ammunition. Magazine lips in conventional magazines may fracture, fail, warp, or show general indications of fatigue during prolonged use or due to impact forces such as dropping a magazine or inserting and removing the magazine from a firearm. Insert 24 may strengthen and preserve the life of the magazine to include the pair of magazine lips 20.

Figure 11:
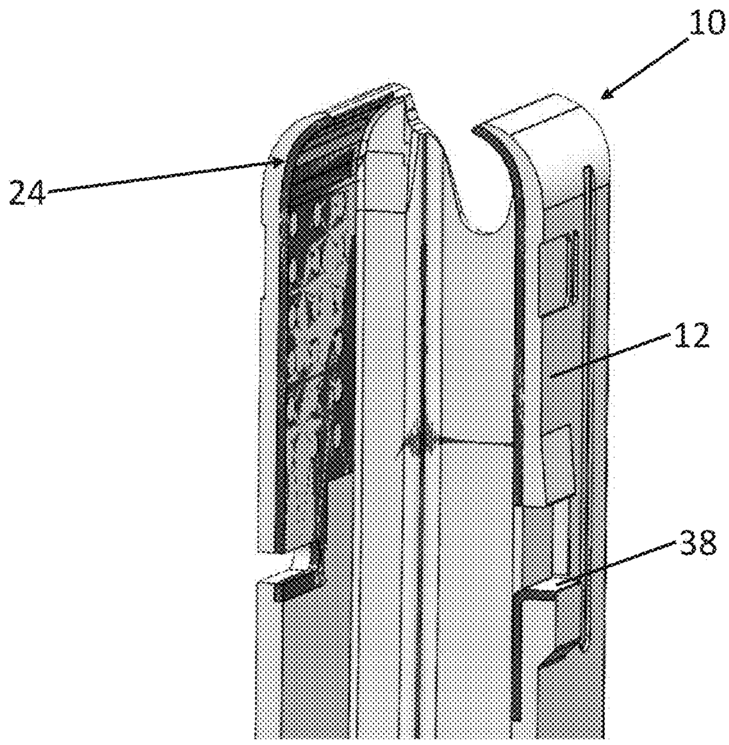
FIG. 11 is a transparent cross-sectional view of an ammunition magazine disclosed herein.

FIG. 11 is a transparent cross-sectional view of an example ammunition magazine 10. In this particular example, the insert 24 may be completely overmolded by a polymer forming the magazine body 12. In some examples, the insert 24 may be a metal, an alloy, a polymer, or combinations thereof. As shown in FIG. 10, the insert 24 magazine catch extension 37 may include a top surface of the extension 38 that may be covered by a polymer forming a reinforced magazine catch. In other examples, the top surface 38 of the magazine catch extension may not be covered by polymer, and bare metal or alloy may be exposed. In other examples, the top surface 38 of the magazine catch extension may be partially covered by polymer, and bare metal or alloy may be partially exposed. During the firing of the firearm, the operator may accidentally hit or strike the bottom of the magazine. The force may fracture the magazine catch, especially if the magazine catch is constructed of a polymer. If the magazine catch fractures, the magazine will likely be rendered inoperative. Reinforcing the polymer (or other material) magazine catch with the metal insert 24 extension 38 may prevent fracturing of the magazine catch, prolonging the reliability and life of the magazine.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

Although examples are described above, features and/or steps of those examples may be combined, divided, omitted, rearranged, revised, and/or augmented in any desired manner. Various alterations, modifications, and improvements will, in view of the foregoing disclosure, readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A magazine comprising:

a body comprising a magazine catch; and an insert, wherein the insert is positioned on an upper portion of an interior of the body, wherein the insert comprises a magazine catch extension, wherein the magazine catch extension bends outward away from the body to reinforce the magazine catch, and wherein the insert comprises a metal, an alloy, or combinations thereof.

2. The magazine of claim 1, wherein the magazine is configured to hold and feed firearm ammunition.

3. The magazine of claim 1, wherein the body is a polymer, a metal, an alloy, or combinations thereof.

4. The magazine of claim 1, further comprising a follower engaged with a spring and a floorplate retainer.

5. The magazine of claim 4, further comprising a floor plate engaged with the floorplate retainer and the body.

6. The magazine of claim 5, wherein the insert includes a first side, a second side, and a rear side, and wherein a height of the first side and second side exceeds a height of the follower.

7. The magazine of claim 6, wherein the height of the first side and the second side is greater than a height of the rear side.

8. The magazine of claim 7, wherein the rear side includes at least one orifice.

9. The magazine of claim 8, wherein the first side and the second side include a plurality of orifices.

10. The magazine of claim 1, wherein the insert magazine catch extension is positioned adjacent to the magazine catch.

11. The magazine of claim 1, wherein at least a portion of the insert is overmolded with the body.

12. A firearm comprising the magazine of claim 1.

13. A magazine comprising:

a body comprising a magazine catch; and an insert, wherein the insert is positioned on an upper portion of an interior of the body, wherein the insert comprises a magazine catch extension, and wherein the magazine catch extension bends outward away from the body to reinforce the magazine catch.

14. The magazine of claim 13, wherein the insert is a metal, an alloy, or combinations thereof.

15. The magazine of claim 14, wherein the body is formed of a polymer, a metal, an alloy, or combinations thereof.

16. The magazine of claim 15, wherein the magazine is configured to hold and feed firearm ammunition.

17. A firearm comprising the magazine of claim 1.

18. A method of making a magazine comprising:

implanting an insert in a magazine body mold, injecting a polymer in the magazine body mold;

overmolding at least a portion of the insert with the polymer; and forming a magazine body wherein the magazine body comprises a magazine catch, wherein the insert is positioned on an upper portion of an interior of the magazine body, wherein the insert comprises a magazine catch extension, and wherein the magazine catch extension bends outward away from the magazine body to reinforce the magazine catch.

19. The method of claim 18, wherein the insert is a metal, an alloy, or combinations thereof.

20. The method of claim 19, wherein the magazine is configured to hold and feed firearm ammunition.

* * * * *